US008595712B2

(12) United States Patent
Komatsu et al.

(10) Patent No.: US 8,595,712 B2
(45) Date of Patent: *Nov. 26, 2013

(54) SOURCE CODE PROCESSING METHOD, SYSTEM AND PROGRAM

(71) Applicant: International Business Machines Corporation, Armonk, NY (US)

(72) Inventors: Hideaki Komatsu, Kanagawa-ken (JP); Takeo Yoshizawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,112

(22) Filed: Jan. 25, 2013

(65) Prior Publication Data

US 2013/0139131 A1    May 30, 2013

Related U.S. Application Data

(63) Continuation of application No. 12/603,598, filed on Oct. 22, 2009, now Pat. No. 8,407,679.

(30) Foreign Application Priority Data

Oct. 24, 2008   (JP) .................................. 2008-274686

(51) Int. Cl.
*G06F 9/45*      (2006.01)
(52) U.S. Cl.
USPC .......................... 717/149; 712/226; 718/102
(58) Field of Classification Search
None
See application file for complete search history.

(56) References Cited

U.S. PATENT DOCUMENTS

| 5,774,728 | A | 6/1998 | Breslau et al. |
| 6,931,635 | B2 | 8/2005 | Inagaki et al. |
| 7,197,747 | B2 | 3/2007 | Ishizaki et al. |
| 2002/0056078 | A1 | 5/2002 | Inagaki et al. |
| 2004/0230770 | A1 | 11/2004 | Odani et al. |
| 2005/0144602 | A1 | 6/2005 | Ngai et al. |

(Continued)

FOREIGN PATENT DOCUMENTS

JP          03080337 A2     4/1991

(Continued)

OTHER PUBLICATIONS

Program Evaluation and Review Technique (PERT), Sep. 17, 2009, pp. 1-8, http://en.wikipedia.org/wiki/Program_Evaluation_and_Review_Technique.

*Primary Examiner* — Elias Mamo
(74) *Attorney, Agent, or Firm* — Cantor Colburn LLP

(57) ABSTRACT

A method, system, and computer readable article of manufacture to enable parallel execution of a divided source code in a multiprocessor system. The method includes the steps of: inputting an original source code by an input device into the computing apparatus; finding a critical path in the original source code by a critical path cut module; cutting the critical path in the original source code into a plurality of process block groups by the critical path cut module; and dividing the plurality of process block groups among a plurality of processors in the multiprocessor system by a CPU assignment code generation module to produce the divided source code. The system includes an input device; a critical path cut module; and a CPU assignment code generation unit to produce the divided source code. The computer readable article of manufacture includes instructions to implement the method.

18 Claims, 14 Drawing Sheets

(56) References Cited

U.S. PATENT DOCUMENTS

| | | |
|---|---|---|
| 2006/0123401 A1 | 6/2006 | O'Brien et al. |
| 2007/0011684 A1 | 1/2007 | Du et al. |
| 2008/0059976 A1 | 3/2008 | Miura |
| 2008/0184011 A1 | 7/2008 | Busck et al. |
| 2009/0254892 A1 | 10/2009 | Yamashita |
| 2012/0079467 A1 | 3/2012 | Tojo et al. |

FOREIGN PATENT DOCUMENTS

| | | |
|---|---|---|
| JP | 06083608 A2 | 3/1994 |
| JP | 07021240 A | 1/1995 |
| JP | 08180100 A2 | 7/1996 |
| JP | 2002149416 A | 5/2002 |
| JP | 2007048052 | 2/2007 |
| JP | 2008515051 | 5/2008 |
| JP | 2008515051 A | 5/2008 |
| JP | 2009129179 A | 6/2009 |

SOURCE CODE PROCESSING METHOD, SYSTEM AND PROGRAM

CROSS-REFERENCE TO RELATED APPLICATIONS

This application is a continuation of U.S. patent application Ser. No. 12/603,598, filed Oct. 22, 2009, now U.S. Pat. No. 8,407,679, which claims priority under 35 U.S.C. §119 from Japanese Patent Application No. 2008-274686, filed on Oct. 24, 2008, the entire contents of which are incorporated herein by reference.

BACKGROUND OF THE INVENTION

1. Field of the Invention

The present invention relates to a method and system for reducing program execution time. More particularly, the present invention relates to a method and system for reducing program execution time in a multiprocessor system.

2. Description of Related Art

Multiprocessor systems, e.g. computing systems which include multiple processors, are widely used in fields such as scientific computation and simulation. In such systems, an application program generates multiple processes and assigns the processes to individual processors. The processors each perform their processing while communicating with each other by using, for example, a shared memory space.

Simulation systems use software for simulation in mechatronics systems for robots, vehicles, and airplanes. The development of electronic component and software technology has enabled electronic control of machines such as robots, vehicles, or airplanes using a wireless LAN or wired connections spread over the machine.

Although machines are fundamentally mechanical devices, they depend on software systems. Accordingly, in product development, a great amount of time, huge cost, and many people are required for the development of control programs and tests for the programs.

Hardware in the loop simulation (HILS) is a technique that has been conventionally used for such tests. In particular, an environment for testing the electronic control units (ECUs) of an entire vehicle is called full-vehicle HILS. In full-vehicle HILS, actual ECUs are connected to a hardware device for emulating an engine mechanism or a transmission mechanism, for example, in a laboratory. Tests are then carried out for predetermined scenarios. Outputs from the ECUs are inputted to a monitoring computer, and are then displayed. Thus, the test operator checks for abnormal operation while looking at the display.

However, in HILS, a special hardware device is required and physical wiring must be made between the special hardware device and actual ECUs. Thus, HILS involves much advance preparation. In addition, when a test is to be performed by replacing ECUs with different ones, the wiring needs to be physically rearranged. This requires time and effort. Moreover, since actual ECUs are used, real-time testing is needed. Accordingly, when a test is performed for many scenarios, a large amount of time is required. Furthermore, hardware devices for HILS emulation are generally extremely expensive.

To address the disadvantages of HILS, a technique using software without using any expensive emulation hardware device, called software in the loop simulation (SILS), has been proposed. In SILS, systems such as microcomputers, input/output circuits, control scenarios, engines, and transmissions, are all emulated by a software simulator. By use of this technique, a test can be carried out without using actual ECU hardware.

An example of a system for supporting SILS is MATLAB™/Simulink™, which is a simulation modeling system available from Cybernet Systems Co., LTD. By using MATLAB™/Simulink™, a simulation program can be created by arranging functional blocks A, B, C, . . . J on a display through a graphical interface, and then specifying process flows as shown by arrows in FIG. 1.

When a block diagram including the functional blocks A, B, C, . . . J is created by MATLAB™/Simulink™, each function can be converted into a C source code describing an equivalent function by a function of Real-Time Workshop™. By compiling the C source code, a simulation can be performed as a SILS in a different computer system.

In particular, a computer system is a multiprocessor system can contribute much to an improvement of processing speed by dividing processing into as many processes as possible and assigning the divided process blocks to individual processors.

Conventional critical path (CP) scheduling techniques are known. By using a CP scheduling technique, the block diagram shown in FIG. 1 is converted into a task graph shown in FIG. 2. The task graph shown in FIG. 2 consists of four vertical rows in which the process lines are assigned to four individual CPUs operating in parallel. With this configuration, the processing speed can be twice as fast as that of the case in which the processing is executed by a single CPU. However, the critical path in FIG. 2 is a path consisting of B-D-F-H-J. The processing time cannot be reduced to be shorter than the time required for the CPU to process this critical path.

Japanese Unexamined Patent Application Publication No. Hei 6-83608 (JP-06083608-A2) discloses a technique for detecting, by a critical path analysis, a bottleneck for program execution by a parallel computer.

Japanese Unexamined Patent Application Publication No. Hei 7-21240 (JP-07021240-A2) relates to layout design for a logical circuit, and discloses a system for shortening the critical path and minimizing the number of nets crossing a cut line.

The above system includes: a critical path extraction unit for extracting a critical path; a cut line generation unit for generating a cut line; a merge pair selection unit for determining a block to be merged with each block on the basis of the connection degrees of the blocks and critical path information; a merging unit for merging each block with the block determined by the merge pair selection unit; and a pair-wise unit for changing pairs so that the number of nets crossing the cut line is minimized.

Japanese Patent Application Publication Hei 8-180100 (JP-08180100-A2) discloses a technique for calculating an optimal solution at a high speed for a job shop scheduling problem including machine assignment. In this technique, an efficient neighborhood is generated and is then combined with an approximate solution.

Japanese Unexamined Patent Application Publication Hei 6-83608 and Japanese Patent Application Publication Hei 8-180100 each disclose only an overview of task scheduling.

In addition, Japanese Unexamined Patent Application Publication Hei 7-21240 describes a technique for shortening the critical path in the layout design of a logical circuit, but the critical path in question is one in a physical layout. Accordingly, the technique is not applicable to logical critical path processing by software.

SUMMARY OF THE INVENTION

It is an object of the present invention to provide a technique for reducing program execution time in a multiprocessor system by parallel processing. The object of the present invention can be achieved as follows. The critical path of a program to be reduced in execution time is cut appropriately so as to be divided into multiple processes. Then, the resulting processes are assigned to individual processors. Consequently, optimal codes for speculative execution in simulation can be outputted.

Specifically, a processing program of the present invention to be reduced in execution time loads the source code of the program which consists of multiple process blocks. Next, the processing program tests all possible cuts for a critical path, and then finds a cut which enables the processing time of the process blocks after the cut is determined to be the shortest.

To enable such processing time calculation, a phase in which the program is compiled and execution times and other values of the respective process blocks are measured is performed in advance. The values measured in this phase include measurement data such as: messaging cost when a process is set to be performed by multiple processors; processing time required for speculative execution; rollback cost when speculation fails; and the degree to which correct calculation of an input to each block is made, e.g., speculation success possibility.

Critical path cutting is recursively applied to paths resulting from the cutting. The cutting is stopped before the overall processing time becomes long, instead of becoming short, with respect to inter-processor communication times. Multiple groups of process blocks are obtained in this manner. In this description, each process block group is called a block chunk.

When the number of block chunks generated by division is equal to or smaller than the number of processors of the multiprocessor system, the individual chunks are compiled without any linking, and are then assigned to the processors in an execution environment.

When the number of block chunks is larger than the number of processors, the processing program of the present invention attempts to link some block chunks so as to make the number of block chunks and the number of processors equal. In this case, linking which can minimize the maximum value of processing time of a critical path among the block chunks resulting from the linking is selected.

The resulting block chunks are each compiled, and are then assigned to the processors in the execution environment. Thus, each of the block chunks is assigned to a single processor, resulting in optimal parallel processing. As described above, the present invention can enable in a multiprocessor environment, high-speed program execution which is improved in terms of both the length of the critical path and processor assignment.

Therefore, in a first aspect of the present invention, there is provided a source code processing method implemented by a computing apparatus to enable parallel execution of a divided source code in a multiprocessor system. The method includes the steps of: inputting an original source code by an input device into the computing apparatus; finding a critical path in the original source code by a critical path cut module; cutting the critical path in the original source code into a plurality of process block groups by the critical path cut module; and dividing the plurality of process block groups among a plurality of processors in the multiprocessor system by a CPU assignment code generation module to produce the divided source code, thereby enabling parallel execution of the divided source code in the multiprocessor system by the computing apparatus.

In another aspect of the present invention, there is provided a computer readable article of manufacture tangibly embodying computer readable instructions for executing the computer implemented method.

In yet another aspect of the present invention, a source code processing system to enabling parallel execution of a divided source code in a multiprocessor system is provided. The system includes: an input device for inputting an original source code; a critical path cut module for finding a critical path in the original source code and for cutting the critical path in the original source code into a plurality of process block groups; and a CPU assignment code generation unit for dividing the plurality of process block groups among a plurality of processors in the multiprocessor system to produce the divided source code by using processing times of the process blocks; and wherein expected processing time of the divided source code is shorter than processing time of the original source code.

DETAILED DESCRIPTION

Figure 1:
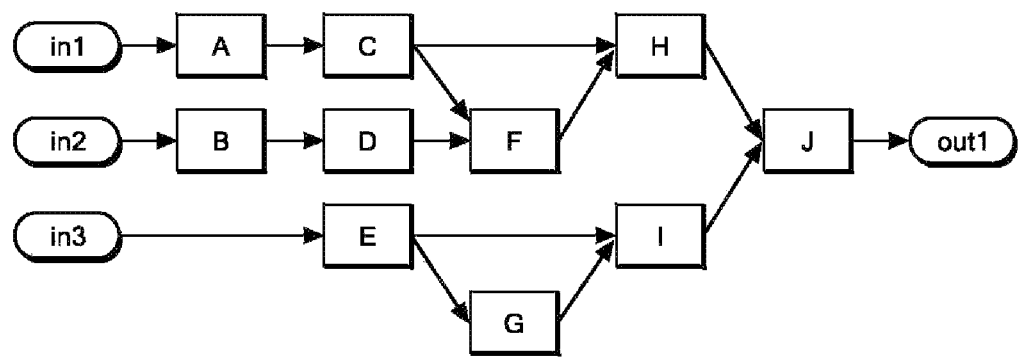
FIG. 1 is a diagram showing an example of a block diagram created by using a simulation modeling tool.
Figure 2:
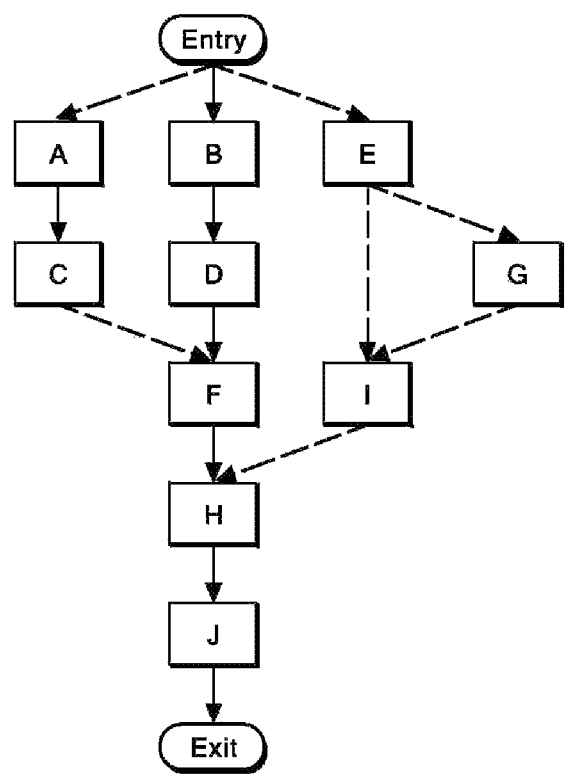
FIG. 2 is a diagram showing an example of a CP scheduling technique.

A configuration and processing according to an embodiment of the present invention will be described below with reference to the accompanying drawings. In the following description, the same components are denoted by the same reference numerals throughout the drawings unless otherwise noted. In addition, the following configuration and processing are described as an embodiment of the present invention. Thus, it is to be understood that the technical scope of the present invention is not intended to be limited to this embodiment.

Figure 3:
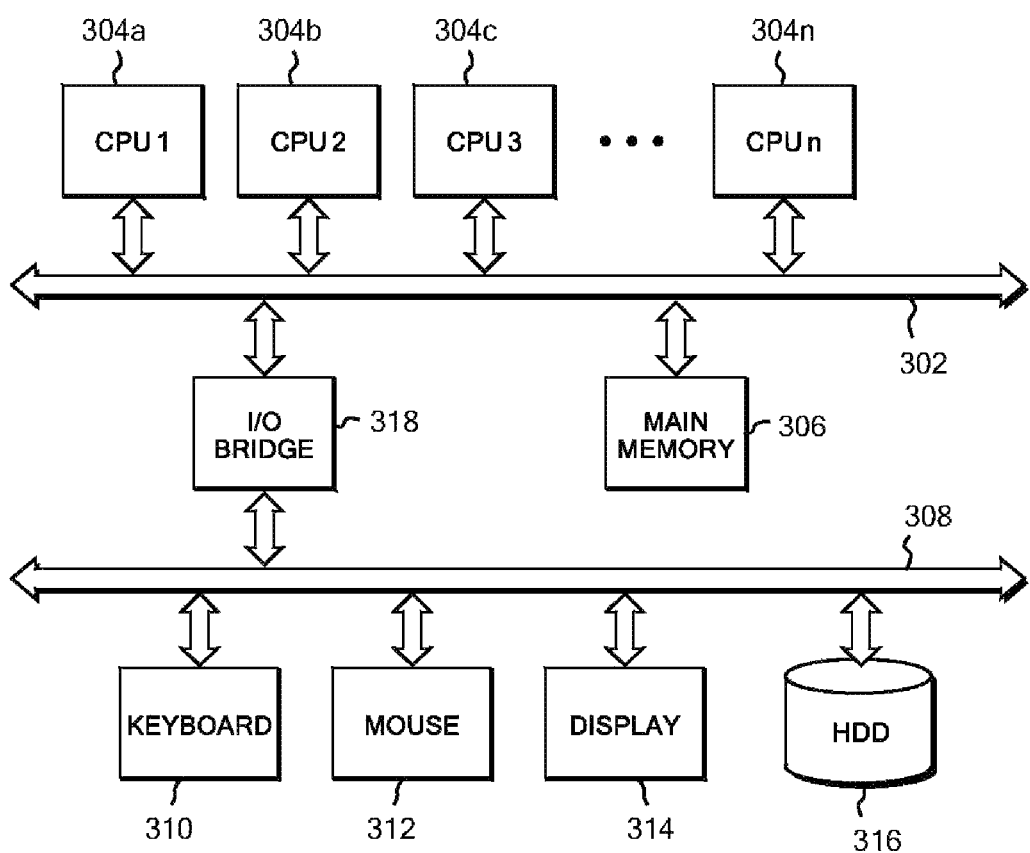
FIG. 3 is a block diagram of hardware for implementing the present invention.

Computer hardware used for implementing the present invention is described with reference to FIG. 3. In FIG. 3, multiple CPUs, CPU 1 304a, CPU 2 304b, CPU 3 304c, ... CPU n 304n, are connected to a host bus 302. To the host bus 302, a main memory 306 for arithmetic processing of the CPU 1 304a, CPU 2 304b, CPU 3 304c, ... CPU n 304n is further connected.

Input devices, a keyboard 310, a mouse 312, a display 314 and a hard disk drive 316 are connected to an I/O bus 308. The I/O bus 308 is connected to the host bus 302 through an I/O bridge 318. The keyboard 310 and the mouse 312 are used by the operator for operations. For example, the operator inputs a command by using the keyboard 310, or clicks on a menu by using the mouse 312. The display 314 is used when needed to display a menu for operating a program according to an embodiment of the present invention through a GUI.

IBM™ System X is the preferable computer system to be used for the purpose of implementing the present invention. When IBM™ System X is used, the CPU 1 304a, CPU 2 304b, CPU 3 304c, ... CPU n 304n are each Intel™ Xeon™, for example, and the operating system is Windows™ Server 2003. The operating system is stored in the hard disk drive 316, and is loaded into the main memory 306 from the hard disk drive 316 at the time of starting the computer system.

Here, the computer system hardware which can be used for implementing the present invention is not limited to IBM™ System X, and any computer system capable of running a simulation program according to an embodiment of the present invention can be used. In addition, the operating system is not limited to Windows™. Another operating system such as Linux™ or Mac OS™ can be used. Moreover, in order to execute the program at high speed, a computer system such as IBM™ System P using AIX™ the operating system, based on POWER™ 6, can be used.

The hard disk drive 316 further stores MATLAB™/Simulink™, a C compiler or a C++ compiler, a module for cutting a critical path according to an embodiment of the present invention, a module for generating a code for CPU assignment, a module for measuring expected execution time for each process block. These are each loaded into and executed by the main memory 306 in response to a keyboard operation or a mouse operation by the operator. Here, the usable simulation modeling tool is not limited to MATLAB™/Simulink™, and any simulation modeling tool such as an open-source Scilab/Scicos can be used, for example.

Alternatively, in some cases, source codes for the simulation system can be directly written in C or C++ without using any simulation modeling tool. The embodiment of the present invention is also applicable to such a case.

Figure 4:
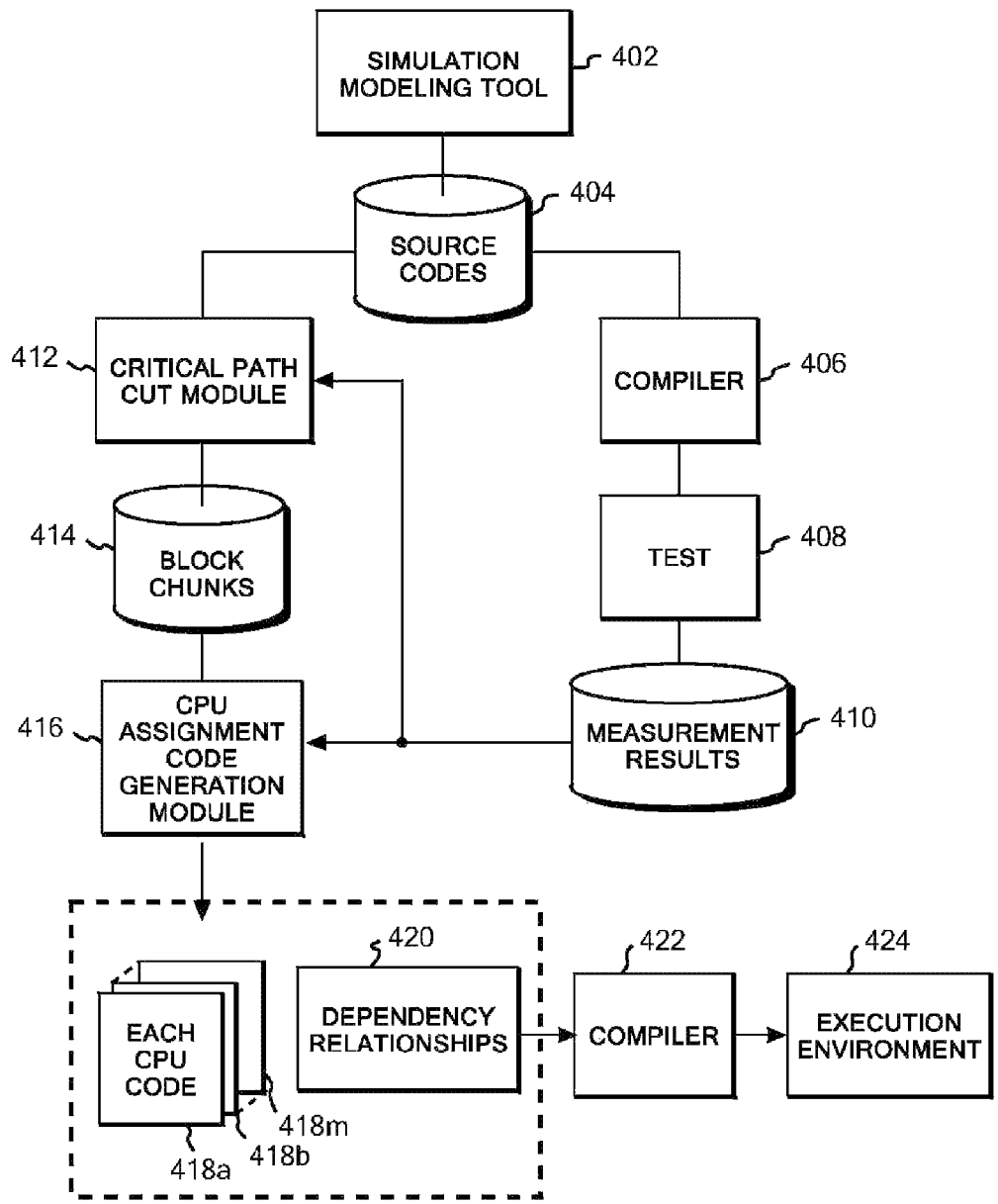
FIG. 4 is a functional block diagram according to an embodiment of the present invention.

FIG. 4 is a functional block diagram according to the embodiment of the present invention. Each block corresponds to a module stored in the hard disk drive 316.

In FIG. 4, a simulation modeling tool 402 may be any existing tool such as MATLAB™/Simulink™ or Scilab/Scicos. The simulation modeling tool 402 has a function which enables the operator to arrange functional blocks on the display 314 through the GUI, to write required attributes such as expressions, and to describe a block diagram by associating the functional blocks with each other when necessary. The simulation modeling tool 402 also has the function of outputting C source codes each describing an equivalent function to one of the described block diagram. Here, C++ or Fortran, for example, can be used in place of C.

The simulation modeling tool can be installed in a personal computer. The source code generated in the personal computer can be downloaded to the hard disk drive 316 through a network, for example. Source codes 404 thus outputted are stored in the hard disk drive 316. Then, the source codes 404 are compiled by a compiler module 406, and a resulting executable program is transmitted to a test module 408.

The test module 408 has the function of carrying out an execution test and the function of carrying out a speculative test. In an execution test, average processing times of the respective blocks as shown in FIG. 1, inter-processor communication times and speculation success probabilities are measured on the basis of a predetermined scenario. Preferably, a single scenario is executed multiple times in order to obtain an average time. Measurement results 410 are stored in the hard disk drive 316 for later use.

In a speculative test, the resulting executable program is speculatively executed on the basis of a different predetermined scenario. By repeatedly executing the scenario, the following times are measured: speculation preparation processing time, that is, time required for a process for storing a speculative input value for a case in which speculation fails and rollback is required; speculation success/failure checking processing time, that is, time required for a process for determining, when receiving actual data, whether the data matches the speculative data; rollback processing time, that is, time required when speculation turns out to be a failure, when the speculative input and the actual value turn out to be different for post-processes including stopping the processing performed on the basis of the incorrect input and deleting the data, for example. Such values are also stored in the hard disk drive 316 as the measurement results 410 for the later use.

The speculation success probability can be calculated without actually performing speculative execution. In speculative execution, since processing is performed before an input which is to be inputted is received, the processing is performed by predicting the input. Accordingly, the speculation success probability is equal to a success rate of prediction on input. This means that when an algorithm to be used for input prediction is determined, a speculation success probability of the speculation algorithm can be calculated only by using actual input data without actually performing speculative execution. This is done without performing block processing based on predicted input data.

Thus, the speculation success probability can be obtained by simply recording an input to each block in an "execution test," and calculating a prediction of success probability of the input prediction algorithm from the input data series. On the other hand, time required for performing speculative execution and time required when the speculative execution failed cannot be obtained without actually performing speculative execution. For this reason, a speculative test is carried out to obtain such information.

Here, when implementation of speculative execution is determined, processing times required for speculation preparation, speculation success/failure check and rollback when speculation fails are assumed to be relative to the amount of input data. Accordingly, in a "speculative test," not all the blocks need to be speculatively executed. Through speculative execution of some blocks having different input data amounts, the relationship between input data amount and speculation-related processing time can be obtained, and cost for each case can consequently be calculated on the basis of the obtained relationship.

The critical path cut module 412 has the function of processing the source codes 404 in blocks and finding and cutting a critical path, thereby finding a cut resulting in an optimal execution time. For this, information on the measurement results 410 is used. The module 412 further generates subdivided block chunks shown in FIG. 10 by recursively applying the critical path cut function. Block chunk information pieces 414 thus generated are stored in the hard disk drive 316 for later use. The critical path cut function will be described later in detail with reference to a flowchart.

A CPU assignment code generation module 416 generates codes 418a, 418b, . . . 418m to be assigned to the CPU 1 to CPU n, by using the block chunk information pieces 414 and the measurement results 410. When the number of block chunks is equal to or smaller than the number of CPU 1 to CPU n, the block chunk codes are directly assigned to the CPU 1 to CPU n.

Figure 14:
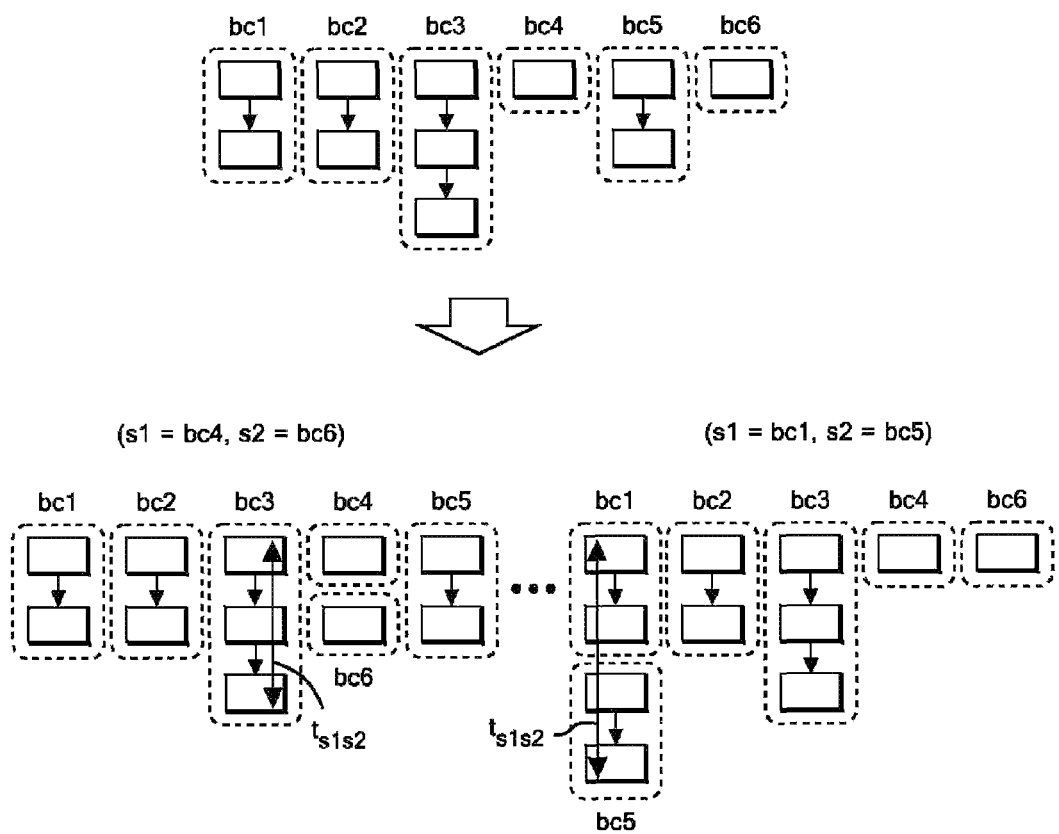
FIG. 14 is a schematic diagram showing an example of block chunk linking.

However, when the number of block chunks is larger than the number of CPU 1 to CPU n, the block chunks are linked as schematically shown in FIG. 14 so that the number of the block chunks and the number of the CPU 1 to CPU n becomes equal. Here, preferably, the links are optimally selected so as to minimize expected execution time of the resulting critical path. The CPU assignment code generation function will also be described later in detail with reference to a flowchart.

Figure 10:
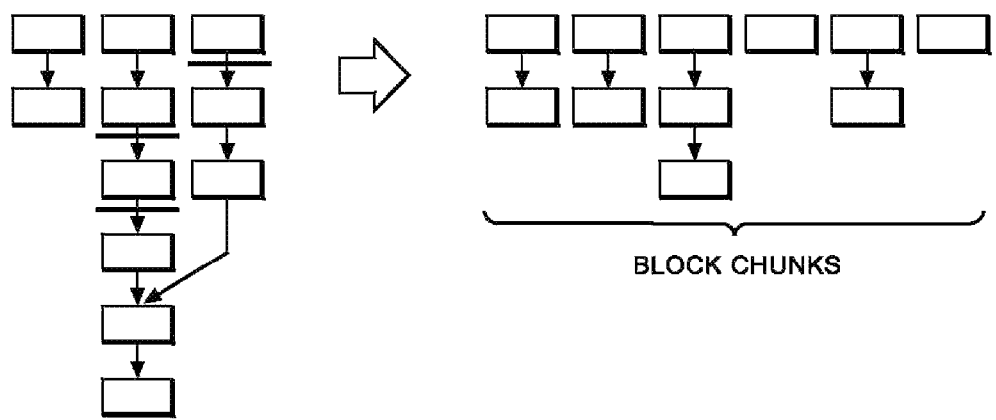
FIG. 10 is a schematic diagram showing an example of block chunk creating.

As a result of this linking, the codes 418a, 418b, . . . 418m to be assigned to the CPU 1 to CPU n, and dependency relationship information pieces 420 are generated. The dependency relationship information pieces 420 are needed for the following reason. Specifically, when an original process flow is divided by the critical path cut function as shown in FIG. 10, original dependency relationships between the blocks are sometimes cut off. In order to compensate for the cut-off relationships, the module 416 provides the dependency relationship information pieces 420 indicating, for example, which code returns a variable used in which code among codes other than itself. In practice, the dependency relationship information pieces 420 are created by the critical path cut module 412 at the time of cutting, and the CPU assignment code generation module 416 consequently uses the dependency relationship information pieces 420 thus created.

The codes 418a, 418b, . . . 418m thus generated are individually compiled as executable programs by the compiler 424, and are individually assigned to the CPU 1 to CPU n in an execution environment 424 so as to be executed in parallel by the corresponding CPU 1 to CPU n. The dependency relationship information pieces 420 are placed in a shared memory area of the main memory 306 so as to be commonly referred to by the CPU 1 to CPU n. When the CPU 1 to CPU n execute the codes 418a, 418b, . . . 418m, the dependency relationship information pieces 420 are referred to by each of the CPU 1 to CPU n to obtain information pieces for codes performed by other CPUs as necessary.

Figure 5:
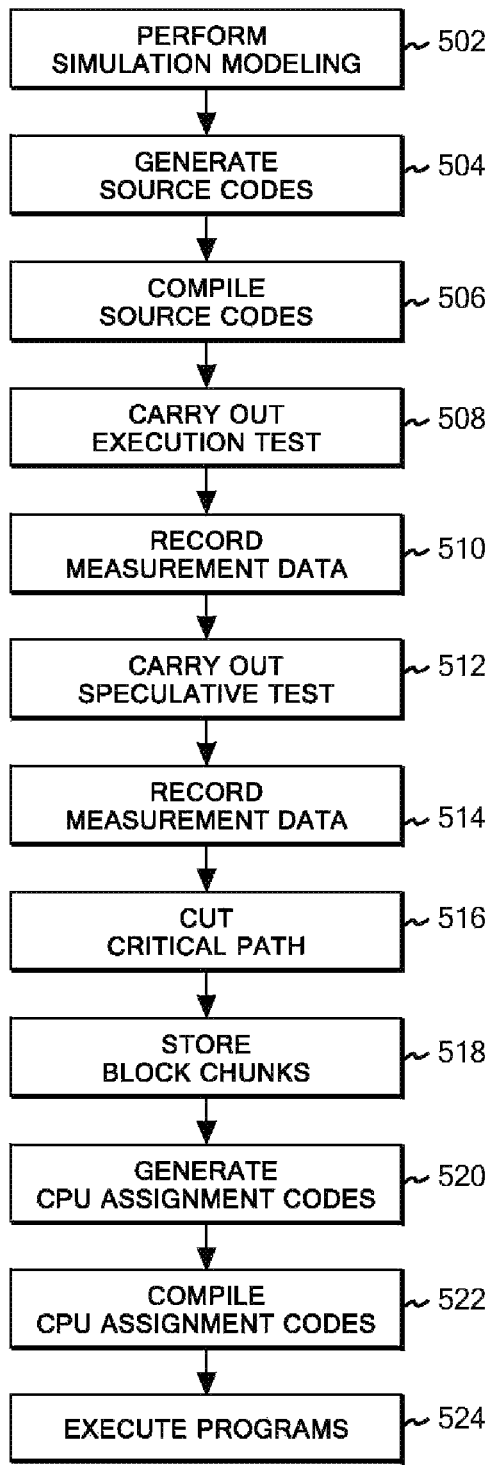
FIG. 5 is a flowchart showing the flow of a process according to an embodiment of the present invention.

FIG. 5 shows a flow of the entire processing according to an embodiment of the present invention. Here, it is to be noted that, since the flow in FIG. 5 shows an operation procedure, the individual steps of the operation procedure do not necessarily correspond to those of a computer processing flow.

In FIG. 5, in Step 502, the developer or the operator creates a block diagram of a particular simulation target on a system shown in FIG. 3 or a different computer, by using the simulation modeling tool 402 such as MATLAB™/Simulink™.

In Step 504, the developer or the operator generates the source codes 404 corresponding to the created block diagram by using one of the functions of the simulation modeling tool 402, and then stores the generated source codes 404 in the hard disk drive 316.

In Step 506, the developer or the operator compiles the source codes 404 by using the compiler 406. Resultant executable programs thus compiled are temporarily stored in the hard disk drive 316, which is not shown in FIG. 5.

In Step 508, the developer or the operator carries out an execution test in the test module 408 by using the compiled execution programs. Measurement data on average processing times of the blocks, inter-processor communication times and speculation success probabilities obtained through the execution test are stored in the hard disk drive 316 as were the measurement results 410 in Step 510.

In Step 512, the developer or the operator carries out a speculative test in the test module 408 by using the compiled execution programs. Measurement data on speculation preparation processing time, speculation success/failure checking processing time and rollback processing time obtained through the speculative test are stored in the hard disk drive 316 as the measurement results in Step 514.

In Step 516, the computer processing is started in response to an operation by the developer or the operator. Basically, the process from Step 516 to Step 524 computer apparatus processing automatically proceeds.

In Step 516, the critical path cut module 412 performs processing on the source codes 404. In the processing, details of which will be described later, a critical path in the entire processing flow described by the source codes 404 is found by using an algorithm. The critical path is optimally cut in terms of processing time, and, in the processing flow after the cutting, processing for cutting the critical path is recursively performed. In Step 516, the measurement results 410 are used.

As a result, multiple block chunks as those shown in FIG. 10 are obtained. Then, in Step 518, information pieces on the block chunks are stored in the hard disk drive 316 as the block chunks 414. Here, the information pieces on the block chunks can be stored in any data structure such as XML, as long as the structure is computer readable and is capable of describing source code contents, link relationships, and links.

In Step 520, the CPU assignment code generation module 416 generates codes to be individually assigned to the CPU 1 to CPU n, by using the block chunk information pieces 414. When the number of block chunks is equal to or smaller than the number of CPU 1 to CPU n, a single block chunk is assigned to each of the CPU 1 to CPU n. On the other hand, when the number of block chunks is larger than the number of CPU 1 to CPU n, the block chunks are linked so that the number of the block chunks and the number of the CPU 1 to CPU n becomes equal so that execution time is minimized. In Step 520, the measurement results 410 are used.

In Step 522, the codes generated by the module 416 are compiled by the compiler 422. Then, in Step 524, the compiled programs are assigned to and then executed by the processors CPU 1 to CPU n.

Figure 7:
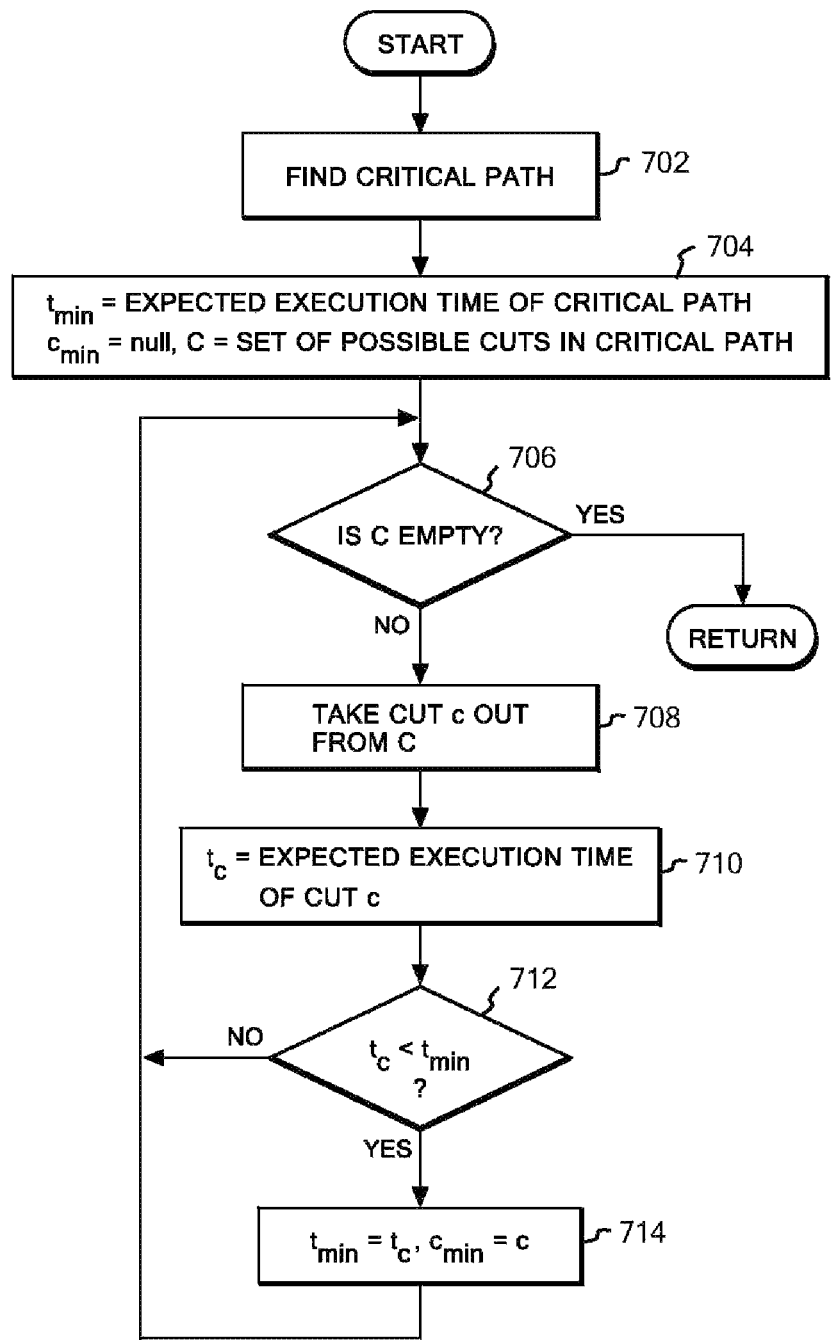
FIG. 7 is a flowchart showing the critical path cutting processing.
Figure 8:
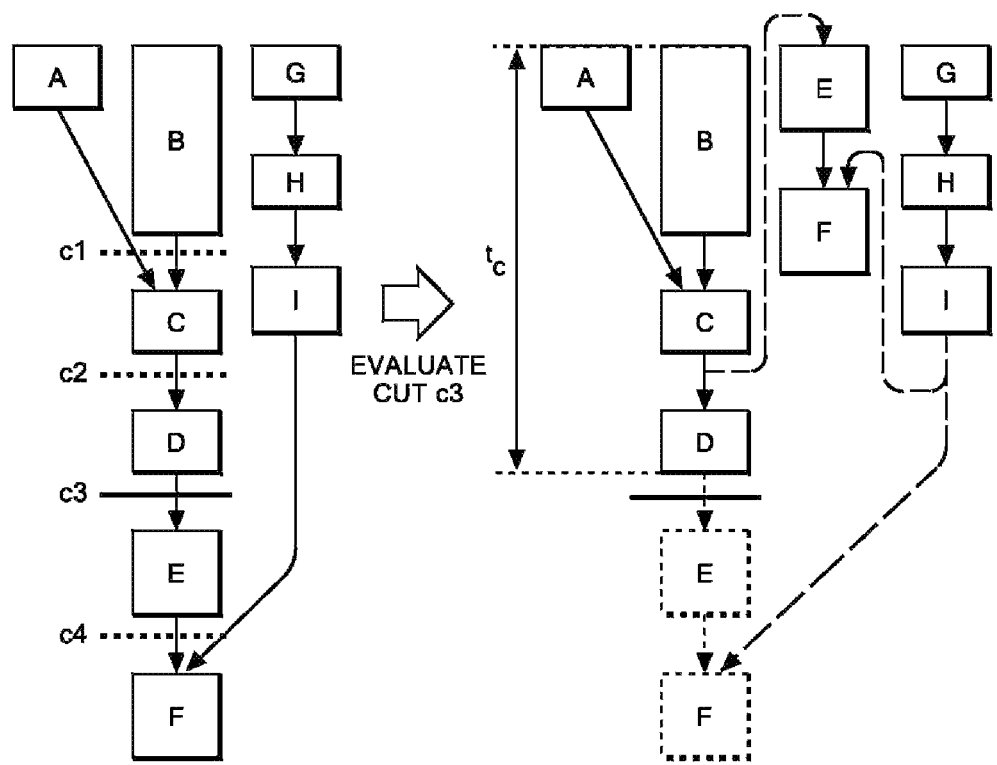
FIG. 8 is a schematic diagram showing an example of the critical path cutting processing.

Next, the critical path cut processing corresponding to Step 516 in FIG. 5 will be described with reference to flowcharts shown in FIG. 6 and FIG. 7. In Step 602 of FIG. 6, processing for finding an optimal cut for the critical path is performed. FIG. 8 is referred to for the explanation of the optimal cut.

FIG. 8 shows a process flow including blocks A to I. Here, the path B-C-D-E-F is identified as the critical path by the algorithm for finding the critical path. In such a case, in Step 602, the critical path cut module 412 sequentially tests possible cuts c1, c2, c3 and c4 along the path B-C-D-E-F. For example, testing the cut c3 means that the critical path is cut at the cut c3 and the cut-out flow is logically moved to the side.

Consequently, two flows are placed in proximity. Then, an evaluation is made of the cut c3. Here, evaluating the cut c3 means that, on the assumption that the speculation success probability is 100 percent, expected execution times of the proximate two flows are compared and the value $T_c$ of the longer of the execution times is evaluated. However, since a speculation success probability is generally lower than 100 percent, the value $T_c$ is evaluated by taking into account the speculation success probability. The cut with which the smallest value $T_c$ can be obtained is called the optimal cut. More detailed processing, e.g. a subroutine, for finding the optimal cut will be described later with reference to the flowchart in FIG. 7.

The expected execution times of the respective blocks are measured in advance in the execution test shown in Step 508 in FIG. 5, and are then stored in the hard disk drive 316 as the measurement results 410. It is to be noted that these measurement results 410 are used in the calculation of an expected execution time of the given flow.

In practice, to calculate execution times, simple execution of execution times expected for the respective blocks, by following the flow, is not sufficient. This will be explained below with reference to FIG. 9.

Definitions will be given to the following variables. Here, execution time of the operation is expressed as the cost.

MSCxy: message sending cost from a block X to a block Y when the block X and the block Y are cut apart.

MRCxy: message receiving cost from the block X to the block Y when the block X and the block Y are cut apart.

SCxy: speculation cost from the block X to the block Y

SCCxy: speculation checking cost from the block X to the block Y

RBCxy: rollback cost when speculation from the block X to the block Y fails

The costs of the blocks are also measured in advance in the execution test shown in Step 508 and the speculative test shown in Step 512 in FIG. 5, and are then stored in the hard disk drive 316 as the measurement results 410.

Figure 9:
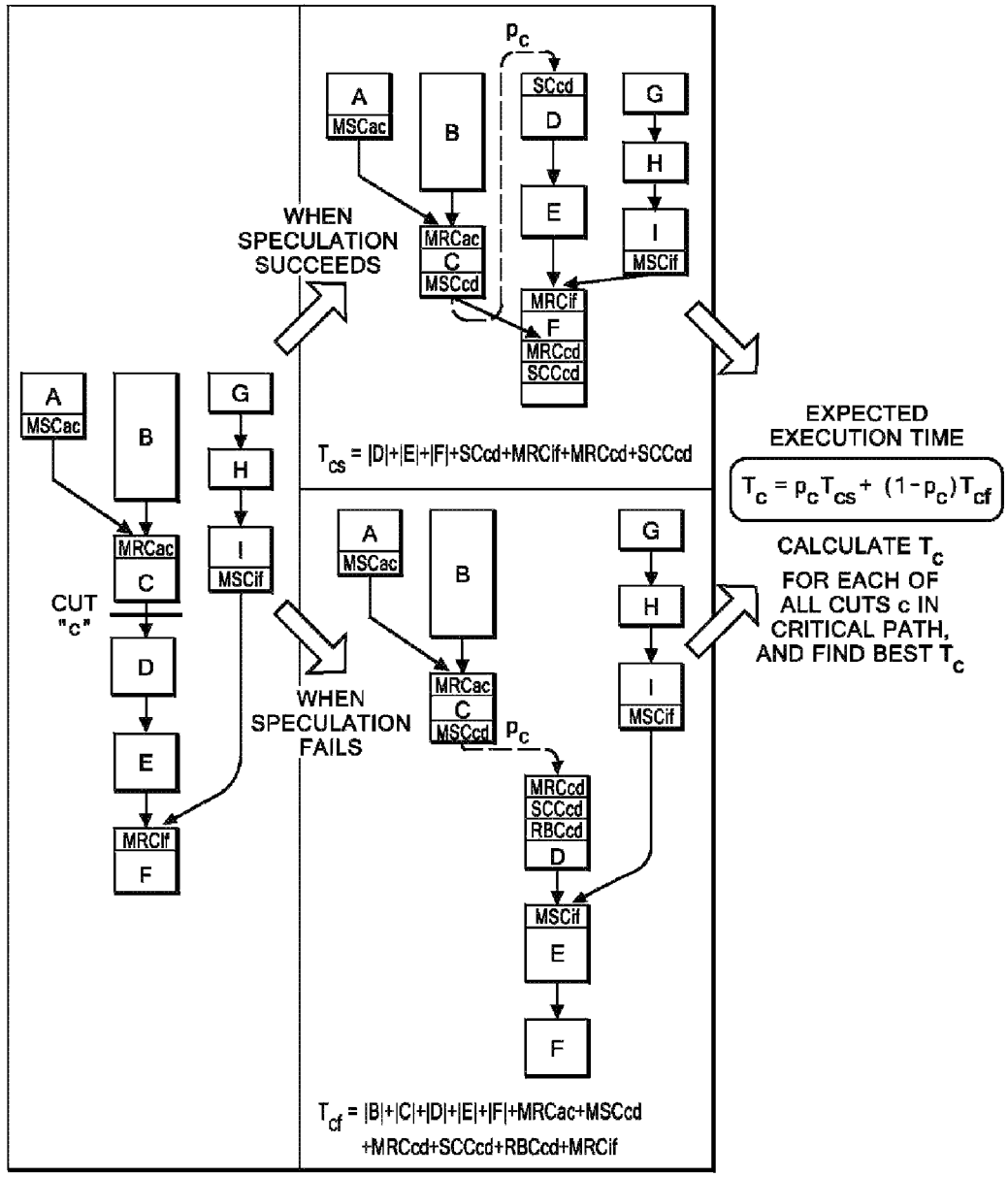
FIG. 9 is a diagram showing expected execution time in a case including speculation.

In consideration of these, when the cut c is placed between the blocks C and D of the critical path B-C-D-E-F, the resulting expected execution time needs to be anticipated by using expected values for the cases where speculation succeeds and where speculation fails, as shown in FIG. 9.

When speculation succeeds, the execution time of the longer one of the two flows obtained as a result of cutting is considered as the resulting expected time, which is described by the following expression.

$$T_{cs} = |D| + |E| + |F| + SCcd + MRCif + MRCcd + SCCcd$$

Here, for example, IDI denotes the execution time of the block D.

By contrast, when speculation fails, the paths B-C and D-E-F are executed in series, and the expected time is accordingly described by the following expression.

$$T_{cf} = |B| + |C| + |D| + |E| + |F| + MRCac + MSCcd + MRCcd + RBCcd + MRCif$$

A success probability $p_c$ of speculation is measured in advance in the execution test shown in Step 508 in FIG. 5, and is then stored in the hard disk drive 316 as the measurement result 410. The resulting expected execution time is calculated by using this measurement result 410, as follows.

$$T_c = p_c T_{cs} + (1-p_c) T_{cf}$$

Figure 6:
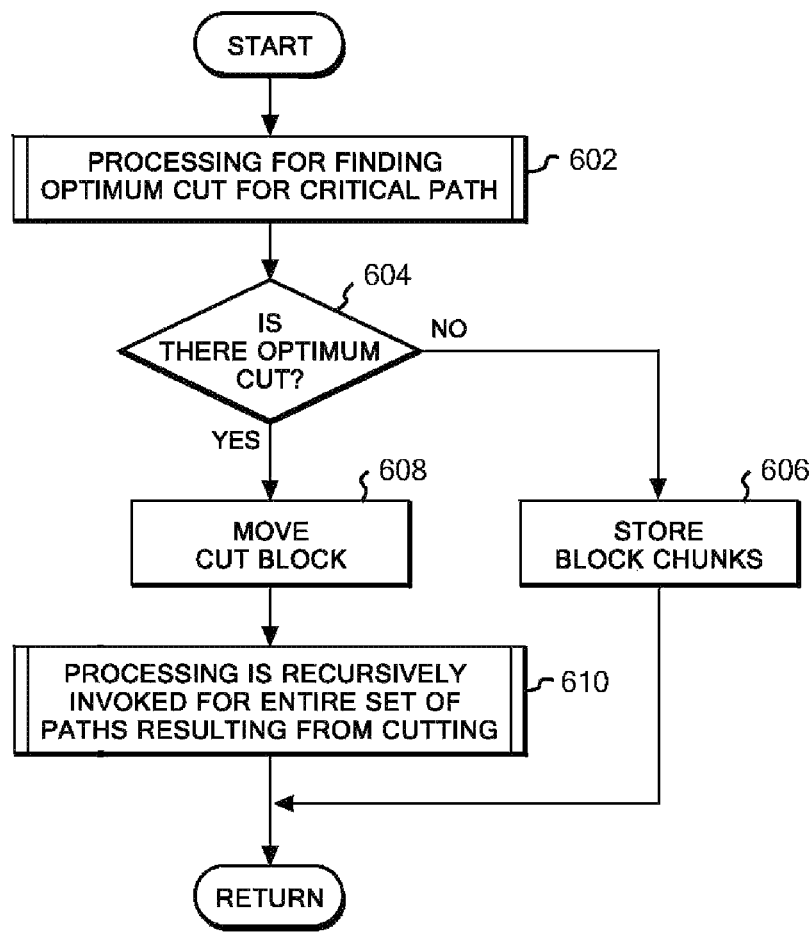
FIG. 6 is a flowchart showing the critical path cutting processing.

Returning to the flowchart of FIG. 6, on the basis of the processing result obtained in Step 602, the critical path cut module 412 determines whether or not an optimal cut exists in Step 604. Having an optimal cut means that the expected processing time overall is shortened as a result of the cutting. Cutting does not always result in shortening processing time. Specifically, in consideration of the above-described sending cost, receiving cost and speculation cost, cutting cannot shorten the processing time in some cases. In such cases, in Step 604, the critical path cut module 412 determines that there is no optimal cut. Then, in Step 606, block chunk information pieces which are currently under evaluation are preferably stored in the hard disk drive 316.

If determining, in Step 604, that an optimal cut exists, the critical path cut module 412 moves the cut-out block in Step 608. This is shown, for example, as the processing in FIG. 8.

In Step 610, the processing shown in the flowchart of FIG. 6 is recursively invoked for the entire set of paths resulting from the cutting. This will be explained by using the blocks shown in FIG. 8. As a result of applying the processing shown in the flowchart of FIG. 6 to the blocks A, B, C, D, E, F, G, H and I, the blocks are first divided into the blocks A, B, C, D, E and F and the blocks G, H and I. Then, the processing shown in the flowchart of FIG. 6 is recursively invoked.

The processing in Step 602 shown in FIG. 6 will be described further in detail with reference to the flowchart shown in FIG. 7. In Step 702, processing for finding a critical path is performed. There are conventional methods of processing for finding a critical path in a process flow. A method based on Program Evaluation and Review Technique (PERT) can be used. For example, see the web page, http://www.kogures.com/hitoshi/webtext/or-pt-pert/index.html or http://en.wikipedia.org/wiki/Program_Evaluation_and_Review_Technique.

In Step 704, the following settings are made: $t_{min}$=time expected for the critical path; $c_{min}$=null; and C=set of possible cuts in the critical path.

In Step 706, it is determined whether or not the set C is empty. If the determination is NO, the process advances to Step 708, and each cut c is selected from the set C.

In Step 710, expected execution time resulting from the cutting using the cut c is calculated, and the calculated execution time is substituted into $t_c$. The calculation of this execution time is also based on the case of speculative execution explained above in relation to FIG. 9.

In Step 712, it is determined whether $t_c < t_{min}$ is satisfied. If $t_c < t_{min}$ is satisfied, the settings are made in Step 714 as follows: $t_{min} = t_c$; and $c_{min} = c$.

Thus, Steps 708, 710, 712 and 714 are performed on each of the cuts included in the set C, and the resulting $c_{min}$ is returned in Step 602 of FIG. 6. In some cases, none of the cuts included in C shorten processing time so as to be shorter than $t_{min}$=time expected for the critical path. In such a case, the determination in Step 712 does not result in YES; thus Step 714 is not performed, and $c_{min}$ remains null, $c_{min}$=null. Consequently, the determination in Step 604 of FIG. 6 results in NO.

FIG. 10 schematically shows a result of such processing. The block processing flow shown on the left side of FIG. 10 is cut at multiple positions by the processing shown in the flowchart of FIG. 6 performed recursively. Consequently, multiple block chunks subdivided as shown on the right side of FIG. 10 are obtained.

With reference to flowcharts shown in FIG. 11 and FIG. 12, the CPU assignment code generation processing corresponding to Step 520 of FIG. 5 will be described. This processing is performed by the CPU assignment code generation module 416 shown in FIG. 4.

In Step 1102, the settings are made as follows: p=the number of processors, e.g., CPUs; and b=the number of block chunks.

In Step 1104, it is determined whether or not p<b is satisfied. If the determination results in NO, that is, p≥b, the number of processors is large enough for the assignment of the block chunks to the processors without linking any block chunks. Accordingly, in Step 1106, the block chunks are individually assigned to the processors as appropriate, and the processing is then terminated.

If it is determined that p<b is satisfied in Step 1104, the number of processors is not enough for the assignment of the block chunks to the processors without linking any block chunks. Accordingly, in Step 1108, processing is performed in which two of the block chunks are linked to each other to reduce the number of block chunks by one.

When two block chunks are linked to each other, the critical path including the linked block chunks may become longer, which may cause the expected processing time to be long. To address this, in Step 1108, an optimal combination is found which minimizes the expected processing time resulting from the linking of two block chunks. FIG. 14 schematically shows such processing.

In Step 1110, the number b is decreased by one, and then the process returns to Step 1104 to make a determination. Thus, Step 1108 and Step 1110 are repeated until p=b is satisfied. When p=b is satisfied, the determination in Step 1104 results in NO. This indicates that the number of processors is enough for the assignment of the block chunks without linking any block chunks. Accordingly, in Step 1106, the resulting block chunks stored at this time are assigned to the processors, and the process is then terminated. When it is desired that some CPUs are to be reserved for different processing, the number of block chunks may be reduced until b<p is satisfied.

Figure 11:
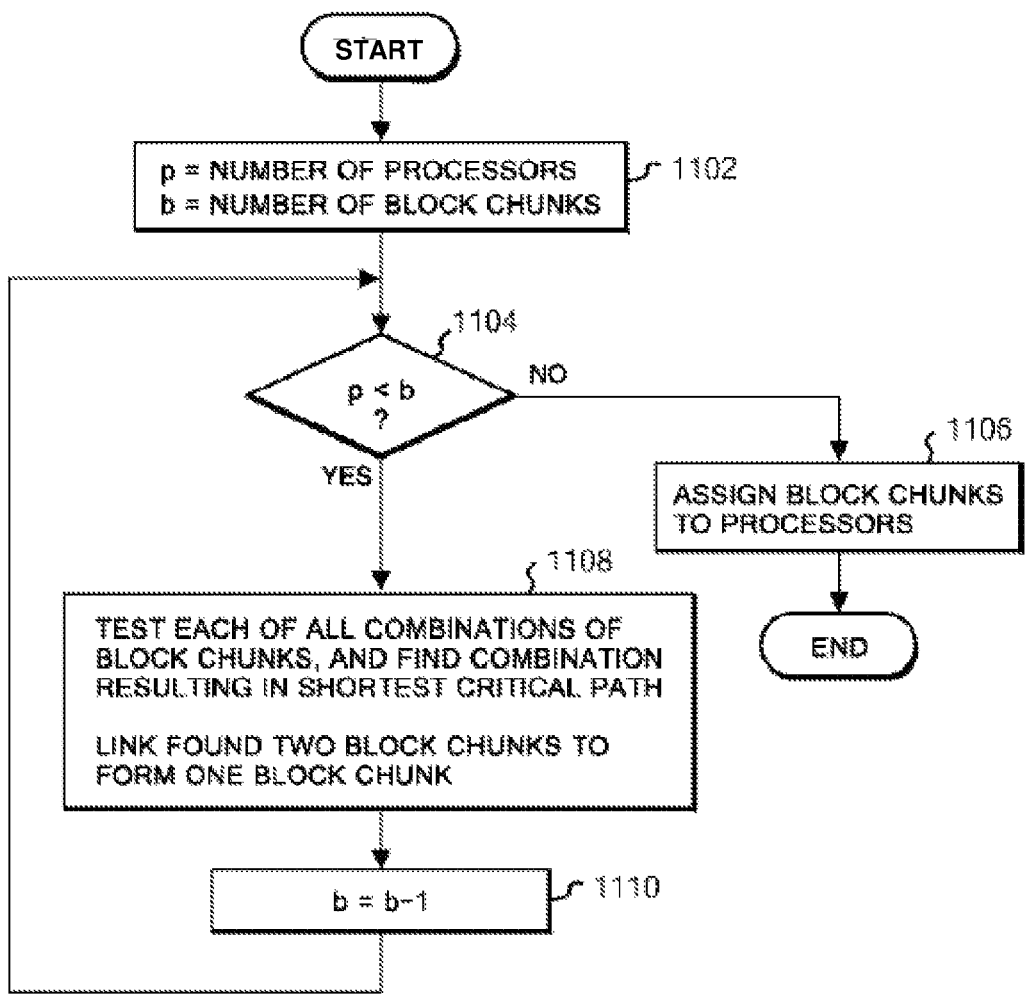
FIG. 11 is a flowchart of CPU assignment code generation processing.
Figure 12:
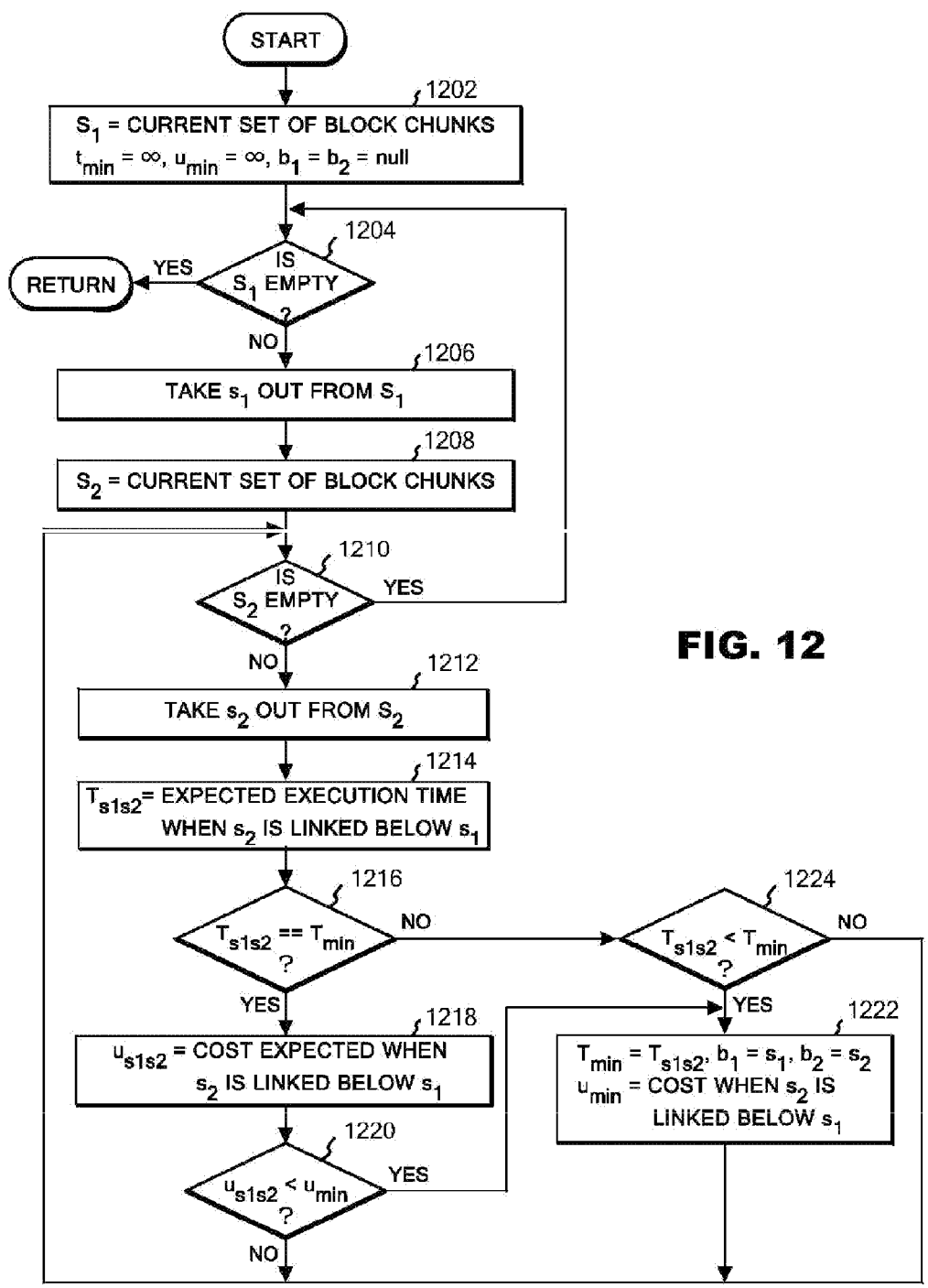
FIG. 12 is a flowchart of the CPU assignment code generation processing.

FIG. 12 is a flowchart describing the processing in Step 1108 of FIG. 11 further in detail. In FIG. 12, in Step 1202, settings are made as follows: $S_1$=current set of block chunks; $t_{min}=\infty$; $u_{min}=\infty$; and $b_1=b_2$=null. Here, $\infty$ indicates that the corresponding number is an appropriate constant number which is larger than the number actually calculated in a corresponding state.

In Step 1204, it is determined whether or not the set $S_1$ is empty. If the set $S_1$ is empty, the processing is completed, and the process returns to Step 1108 in the flowchart of FIG. 11. If the set $S_1$ is not empty, a single block chunk $s_1$ is taken from the set $S_1$ in Step 1206.

In Step 1208, the setting is made as follows: $S_2$=current set of block chunks. In Step 1210, it is determined whether or not the set $S_2$ is empty. If the set $S_2$ is empty, the process returns to Step 1204. If the set $S_2$ is not empty, a single block chunk $s_2$ is taken from the set $S_2$ in Step 1212.

In Step 1214, the execution time when the block chunk $s_2$ is linked below the block chunk $s_1$ is calculated by using the measurement results 410 of the blocks shown in FIG. 4, and the calculated value is substituted into $T_{s1s2}$. Here, a case in which block chunk $s_2$=block chunk $s_1$ is satisfied is excluded. Since each of the block chunks are a part of the original block flow, it can be determined which one of block chunks, between any two block chunks, is originally on the upstream side. Accordingly, if the upstream/downstream relationship can be determined, the linking is preferably made so as to maintain the upstream/downstream relationship in Step 1214.

In Step 1216, it is determined whether $T_{s1s2}$ is equal to $T_{min}$. If $T_{s1s2}$ is equal to $T_{min}$, cost expected when the set $s_2$ is linked below the set $s_1$ is calculated, and the calculated value is substituted into $U_{s1s2}$. Here, the cost is the expected value of the entire CPU expended time, and is calculated such that the speculation success probability for each of the two cases where possible speculation succeeds or fails is assigned as a weight to execution times of the respective blocks. Also included is message sending and receiving costs between blocks performed by different processors, speculation costs, speculation checking costs, and rollback costs at the time of speculation failure.

In Step 1220, it is determined whether $u_{s1s2}<u_{min}$ is satisfied. If $u_{s1s2}<u_{min}$ is satisfied, settings are made as follows: $T_{min}=T_{s1s2}$; $b_1=s_1$; and $b_2=s_2$, and the cost expected when the set $s_2$ is linked below the set $s_1$ is substituted into $u_{min}$. Then, the process returns from Step 1222 to Step 1210 to make the determination whether or not the set $S_2$ is empty.

When $T_{s1s2}$ is not equal to $T_{min}$, the process advances to Step 1224, and it is determined whether $T_{s1s2}<T_{min}$ is satisfied. If $T_{s1s2}<T_{min}$ is satisfied, Step 1222 is performed, and the process then returns to Step 1210 to make the determination whether or not the set $S_2$ is empty. If $T_{S1S2}<T_{min}$ is not satisfied, the process returns from Step 1224 immediately to Step 1210 to make a determination whether or not the set $S_2$ is empty.

Figure 13:
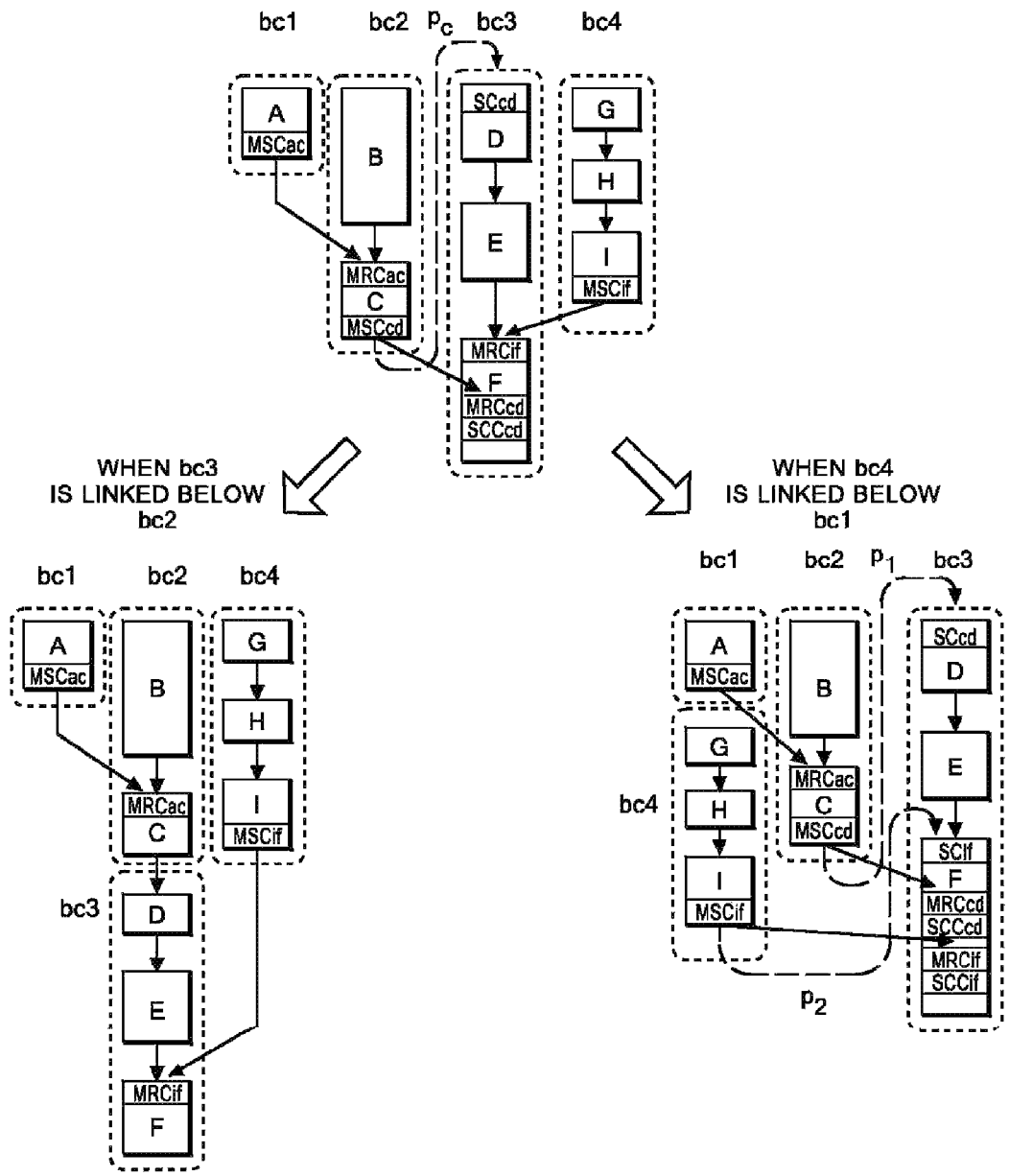
FIG. 13 is a schematic diagram showing an example of block chunk linking.

FIG. 13 shows an example of block chunk linking. As shown in FIG. 13, this example includes four block chunks bc1, bc2, bc3 and bc4. When the order of the block chunks of each link does not need to be limited to the upstream/downstream relationship in the original flow, twelve ways of linking can be made out of the block chunks bc1, bc2, bc3 and bc4.

However, since the description becomes too long if all the links are covered, the following two cases will be described as examples: one shown in the bottom left of FIG. 13 in which the block bc3 is linked below the block bc2; and one shown in the bottom right of FIG. 13 in which the block bc4 is linked below the block bc1.

In the case where the block bc3 is linked below the block bc2, expected execution time $t_{bc2\ bc3}$ and expected execution cost $U_{bc2\ bc3}$ are calculated as follows.

$$t_{bc2\ bc3}=|B|+|C|+|D|+|E|+|F|+MRCac+MRCif$$

$$u_{bc2\ bc3}=|A|+|B|+|C|+|D|+|E|+|F|+|G|+|H|+|I|+MRCac+MRCif+MSCac+MSCif$$

By contrast, in the case where the block bc4 is linked below the block bc1, expected execution time $t_{bc1\ bc4}$ and expected execution cost $u_{bc1\ bc4}$ are calculated as follows.

$$t_{bc1\ bc4}=p_1p_2\times(|D|+|E|+|F|+SCcd+SCif+MRcd+SCCcd+MRCif+SCCif)+p_1(1-p_2)\times(|A|+|G|+|H|+|I|+|F|+MSAac+MSCif+MRCif+SCCif+RBCif)+(1-p_1)\times(|B|+|C|+|D|+|E|+|F|+MRCac+MSCcd+MRCcd+SCCcd+RBCcd+MRCif)$$

$$u_{bc1\ bc4}=|A|+|B|+|C|+|D|+|E|+|F|+|G|+|H|+|I|+p_1p_2\times(SCcd+SCif+MRcd+SCCcd+MRCif+SCCif)+p_1(1-p_2)\times(MSAac+MSCif+MRCif+SCCif+RBCif)+(1-p_1)\times(MRCac+MSCcd+MRCcd+SCCcd+RBCcd+MRCif)$$

Here, $p_1$ and $p_2$ denote speculation success probabilities in the paths shown in FIG. 13, respectively. All the individual values in the expressions are obtained from the measurement results 410.

FIG. 14 shows processing in a case where, since six block chunks bc1, bc2, bc3, bc4, bc5 and bc6 are present while only five CPUs are provided, the CPU assignment code generation module 416 proceeds to link two block chunks in order to reduce the number of the block chunks by 1.

In the case shown in the bottom left of FIG. 14, the block bc6 is linked below the block bc4, and the execution time of the block bc3 results in the longest execution time $t_{s1s2}$.

In the case shown in the bottom right of FIG. 14, the block bc5 is linked below the block bc1, and the execution time of the block bc1 results in the longest execution time $t_{s1s2}$.

The CPU assignment code generation module 416 calculates the longest execution time $t_{s1s2}$ for each of all the combinations of block chunks, and then selects the link of block chunks whose execution time $t_{s1s2}$ is consequently the shortest. The generated codes for the respective CPUs are individually compiled by the compiler 422 and converted into executable codes, and are then temporarily stored in the hard disk drive 316.

Figure 15:
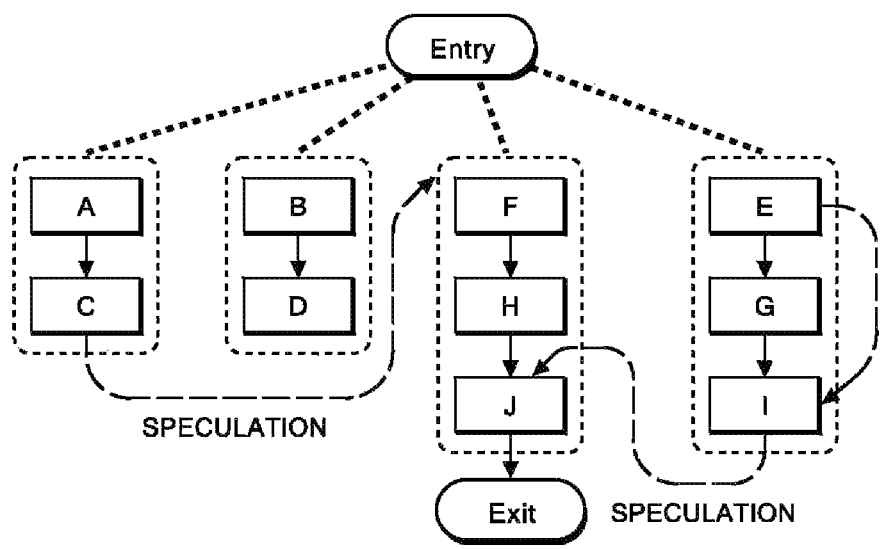
FIG. 15 is a diagram explaining dependency relationships between blocks.

When the flow of blocks originally linked is cut, the dependency relationship between the blocks after the cutting is separated in some cases. This requires that the information pieces must be adjusted as shown in FIG. 15. FIG. 15 is a schematic view for explaining such a dependency relationship.

In FIG. 15, a code formed of the block A and the block C is denoted by Code 1, a code formed of the block B and the block D is denoted by Code 2, a code formed of the block F, the block H and the block J is denoted by Code 3, and a code formed of the block E, the block G and the block I is denoted by Code 4.

Contents in Code 1, Code 2, Code 3 and Code 4 are as shown in FIG. 15. As seen from FIG. 15, the argument of Code 3 uses the first return values of the Code 1, Code 2 and Code 4. This is described as follows. For example, the 1st output of Code 1 is included in the 1st argument of Code 3; the 1st output of Code 2 is included in the 2nd argument of Code 3; and the 1st output of Code 4 is included in the 3rd argument of Code 3.

The CPU assignment code generation module 416 generates these information pieces together with corresponding CPU assignment codes.

The compiler 422 can be notified of dependency relationship information pieces in such a manner that the dependency relationship information pieces are included in the corresponding CPU assignment codes. However, preferably, the dependency relationship information pieces are, for example, stored directly in the shared memory of the execution environment 424 so that the CPU 1 to CPU n can refer to the information pieces when executing the assigned codes.

Subsequently, when a simulation operation is started by an operation of the operator, the compiled executable programs for the CPUs are sequentially loaded into the main memory 306 by the execution environment 424, and the execution environment 424 assigns the processes generated in association with the executable programs to the individual processors. Thus, the simulation program is divided into multiple executable programs, and the multiple executable programs are executed in parallel by the respective processors.

In the above-described embodiment, parallel processing in which processes are divided and assigned to multiple CPUs on the basis of program source codes generated by using a simulation modeling tool has been described. However, the present invention is applicable not only to the case based on such a simulation program source code, but also to any source code as long as identifying process block units and describing the flow of the process blocks can be done.

While the present invention has been described with reference to what are considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A source code processing method implemented by a computing apparatus to enable parallel execution of a divided source code in a multiprocessor system, the method comprising the steps of:

finding a critical path in an original source code, input to the computing apparatus, by a critical path cut module;

cutting the critical path in the original source code into a plurality of process block groups by the critical path cut module;

dividing the plurality of process block groups among a plurality of processors in the multiprocessor system by a CPU assignment code generation module to produce the divided source code, thereby enabling parallel execution of the divided source code in the multiprocessor system by the computing apparatus; and measuring cost of messaging, processing time for speculative execution, cost for rollback when the speculative execution fails, and speculation success probability, when a process is performed by the plurality of processors by the test module.

2. The method according to claim 1, wherein the step of dividing the process block groups among the plurality of processors is carried out using the processing times of the process blocks.

3. The method according to claim 2, wherein expected processing time of the divided source code is shorter than processing time of the original source code.

4. The method according to claim 1, further comprising the steps of:

compiling the divided source code by a compiler module;
executing the divided source code by a test module; and
measuring a processing time of each of the process blocks of the divided source code by the test module.

5. The method according to claim 3, further comprising the step of:

minimizing the expected processing time of the process block group having the longest expected processing time by the CPU assignment code generation module.

6. The method according to claim 1, further comprising the step of:

generating dependency relationships between variables of the process blocks and arguments of the process blocks by the CPU assignment code generation module.

7. The method according to claim 1, further comprising the step of:

comparing the number of the process block groups with the number of the processors in the multiprocessor system; and
linking at least two of the process block groups to create at least one linked process group when the number of the process block groups is larger than the number of the processors to make the number of the process block groups equal to or smaller than the number of the processors by the CPU assignment code generation module.

8. The method according to claim 7, further comprising linking the process block groups according to the processing times to minimize an expected processing time of the linked process block group having the longest expected processing time among the linked process block groups by the CPU assignment code generation module.

9. The method according to claim 1, further comprising:

generating the original source code by a simulation modeling tool, wherein the process blocks of the source code correspond to blocks in a block diagram created by the simulation modeling tool.

10. A source code processing system to enabling parallel execution of a divided source code in a multiprocessor system comprising:

a critical path cut module for finding a critical path in an original source code input to a computing apparatus and for cutting the critical path in the original source code into a plurality of process block groups; and a CPU assignment code generation unit for dividing the plurality of process block groups among a plurality of processors in the multiprocessor system to produce the divided source code by using processing times of the process blocks;

wherein expected processing time of the divided source code is shorter than processing time of the original source code; and wherein the test module measures cost of messaging, processing time for speculative execution, cost for rollback when the speculative execution fails, and speculation success probability, when a process is performed by the plurality of processors.

11. The system according to claim 10, further comprising:
a compiler module for compiling the divided source code; and
a test module for executing the divided source code, for measuring a processing time of each of the process blocks of the divided source code.

12. The system according to claim 10, wherein the CPU assignment code generation module minimizes the expected processing time of the process block group having the longest expected processing time.

13. The system according to claim 11, wherein the CPU assignment code generation module generates dependency relationships between variables of the process blocks and arguments of the process blocks.

14. The system according to claim 10, wherein the CPU assignment code generation module compares the number of the process block groups with the number of the processors in the multiprocessor system; and links at least two of the process block groups to create at least one linked process group when the number of the process block groups is larger than the number of the processors to make the number of the process block groups equal to or smaller than the number of the processors.

15. The system according to claim 10, wherein the CPU assignment code generation module links the process block groups according to the processing times to minimize an expected processing time of the linked process block group having the longest expected processing time among the linked process block groups by the CPU assignment code generation module; and wherein the CPU assignment code generation module loads the dependency relationships to allow the individual processors in the multiprocessor system to refer to the dependency relationships.

16. The system according to claim 10, further comprising:
a simulation modeling tool for generating the original source code, wherein the process blocks of the source code correspond to blocks in a block diagram created by the simulation modeling tool.

17. The system according to claim 10, further comprising:
a compiler module for compiling the divided source code, and the CPU assignment code generation unit assigning the compiled divided software among the plurality of processors in multiprocessor system.

18. A computer readable article of manufacture tangibly embodying computer readable instructions which, when executed, cause a computing apparatus to implement a method to enable parallel execution of a divided source code in a multiprocessor system, comprising the steps of:
finding a critical path in an original source code, input to the computing apparatus, by a critical path cut module;
cutting the critical path in the original source code into a plurality of process block groups by the critical path cut module;
dividing the plurality of process block groups among a plurality of processors in the multiprocessor system by a CPU assignment code generation module to produce the divided source code; and
measuring cost of messaging, processing time for speculative execution, cost for rollback when the speculative execution fails, and speculation success probability, when a process is performed by the plurality of processors by the test module.

* * * * *